US010068550B1

United States Patent
Chen (10) Patent No.: US 10,068,550 B1
(45) Date of Patent: Sep. 4, 2018

(54) CONTROLLING A BRIGHTNESS SETTING OF AN OPTICAL OUTPUT DEVICE BASED ON BRIGHTNESS SETTING OF A COMPANION DEVICE

(71) Applicant: Square, Inc., San Francisco, CA (US)

(72) Inventor: Grace Huey Chen, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/471,062

(22) Filed: Mar. 28, 2017

Related U.S. Application Data (63) Continuation of application No. 14/709,394, filed on May 11, 2015, now abandoned.

(51) Int. Cl.
*G09G 5/12* (2006.01)
*G09G 5/10* (2006.01)
*G09G 3/32* (2016.01)
*G06Q 20/20* (2012.01)
*G06Q 20/32* (2012.01)
*G07F 7/08* (2006.01)

(52) U.S. Cl.
CPC .......... *G09G 5/10* (2013.01); *G09G 3/32* (2013.01); *G09G 5/12* (2013.01); *G06Q 20/204* (2013.01); *G06Q 20/3278* (2013.01); *G07F 7/088* (2013.01); *G09G 2320/0626* (2013.01); *G09G 2320/08* (2013.01); *G09G 2360/144* (2013.01)

(58) Field of Classification Search
CPC combination set(s) only.
See application file for complete search history.

(56) References Cited

U.S. PATENT DOCUMENTS

| 7,865,430 | B1 * | 1/2011 | Kolls ................. G06Q 20/10 235/381 |
|---|---|---|---|
| 9,489,670 | B2 * | 11/2016 | McGill ............. G06Q 20/3274 |
| 2008/0017704 | A1 * | 1/2008 | VanDeburg ........... G06Q 20/32 235/380 |
| 2013/0084801 | A1 | 4/2013 | Royston et al. |
| 2014/0316560 | A1 | 10/2014 | Hoormann et al. |
| 2015/0133047 | A1 * | 5/2015 | Smith .............. G06K 7/10198 455/41.1 |

(Continued)

OTHER PUBLICATIONS

Non-Final Office Action dated Jun. 27, 2016, for U.S. Appl. No. 14/709,394, of Chen, G.H., filed May 11, 2015.

(Continued)

*Primary Examiner* — Ryan M Gray
(74) *Attorney, Agent, or Firm* — Polsinelli PC (57) ABSTRACT

A point-of-sale system includes a computing device, such as a mobile phone or tablet, and a payment object reader communicatively coupled to the computing device that is used to acquire data from a payment object reader. The payment object reader includes an optical output device. The brightness of the optical output device is controlled by the payment object reader depending on the brightness of the computing device coupled to the payment object reader. The brightness level of the optical output device of the payment object reader, which can be a near field communication (NFC) signal strength indicator having four light-emitting-diodes (LEDs), is coordinated to the brightness level of the computing device.

21 Claims, 9 Drawing Sheets

(56) References Cited

U.S. PATENT DOCUMENTS

2015/0348009 A1   12/2015  Brown et al.
2016/0007290 A1    1/2016  Lindemann et al.
2016/0088711 A1*  3/2016  Ng .................... H05B 37/0218
                                                        315/152

OTHER PUBLICATIONS

Notice of Allowance dated Dec. 29, 2016, for U.S. Appl. No. 14/709,394, of Chen, G.H., filed May 5, 2015.

* cited by examiner

FIG. 10

CONTROLLING A BRIGHTNESS SETTING OF AN OPTICAL OUTPUT DEVICE BASED ON BRIGHTNESS SETTING OF A COMPANION DEVICE

CROSS-REFERENCE TO RELATED APPLICATIONS

This application is a continuation of U.S. patent application Ser. No. 14/709,394, entitled "CONTROLLING A BRIGHTNESS SETTING OF AN OPTICAL OUTPUT DEVICE BASED ON BRIGHTNESS SETTING OF A COMPANION DEVICE," filed on May 11, 2015, which is hereby expressly incorporated herein by reference in its entirety.

BACKGROUND

In some point-of-sale systems, at least one element or device in the system may have an optical output device. The optical output device can be a display, or LED, or any other light-emitting source. Point-of-sale systems typically include a computing device having a display, a payment object reader having LEDs, and potentially other devices or elements used in carrying out the point-of-sale transaction. In certain environments, it can be undesirable for different elements to have different display properties, such as brightness of the display and LEDs. For example, in a café at sunset, it is undesirable to have one device with a dim setting while another device has a bright setting. It is further undesirable to need to adjust the display setting of each component individually.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Systems and methods in accordance with various embodiments of the present disclosure overcome one or more of the above-referenced and other deficiencies in conventional approaches to conducting financial transactions. In particular, in accordance with various embodiments, approaches provide for controlling a brightness setting of an optical output device that is coupled to, or included as a part of, a payment object reader. The payment object reader is coupled to a computing device used in performing a payment transaction at a point-of-sale system. The optical output device can indicate signal strength between a payment object and a payment object reader. The payment object can be any object used in performing a payment in appoint-of-sale transaction, such as a magnetic stripe-type card, a chip-type card, an NFC-enabled object, and can also be another mobile device having NFC capabilities.

In some embodiments, the payment object reader includes an audio plug configured to be inserted into an audio jack of a mobile device, a slot, opening or module for receiving a payment object, and a payment object reading device for reading information off the payment object. The payment object can be swept in a slot of the payment object carder (for example, for magnetic stripe-type cards), inserted into an opening to contact a payment object (for example for EMV or chip-type payment cards) or simply placed proximate the payment object reader, by a "tap" or "hover" proximate the payment object reader in some embodiments (for example, using a near field communication (NFC) module). The card reader can, in some embodiments, have a communication module instead of, or in addition to, the audio plug, for communicating wirelessly (e.g., Bluetooth, BLE, WiFi, etc.) to a mobile device or other computing device.

The payment object reader, in some embodiments, includes an optical output device. The optical output device can be a display (such as an LCD or touchscreen display), a light-emitting-diode (LED), or another visual indicator. In accordance with the embodiments herein, the brightness of the optical output device of the payment object reader is controlled automatically to coincide with the brightness of the computing device to which the payment object reader is coupled, either by direct coupling or wireless coupling. This allows the brightness of the optical output device to be adjusted to coordinate with the first display, without requiring each of the optical output device and the first display being adjusted independently.

Figure 1:
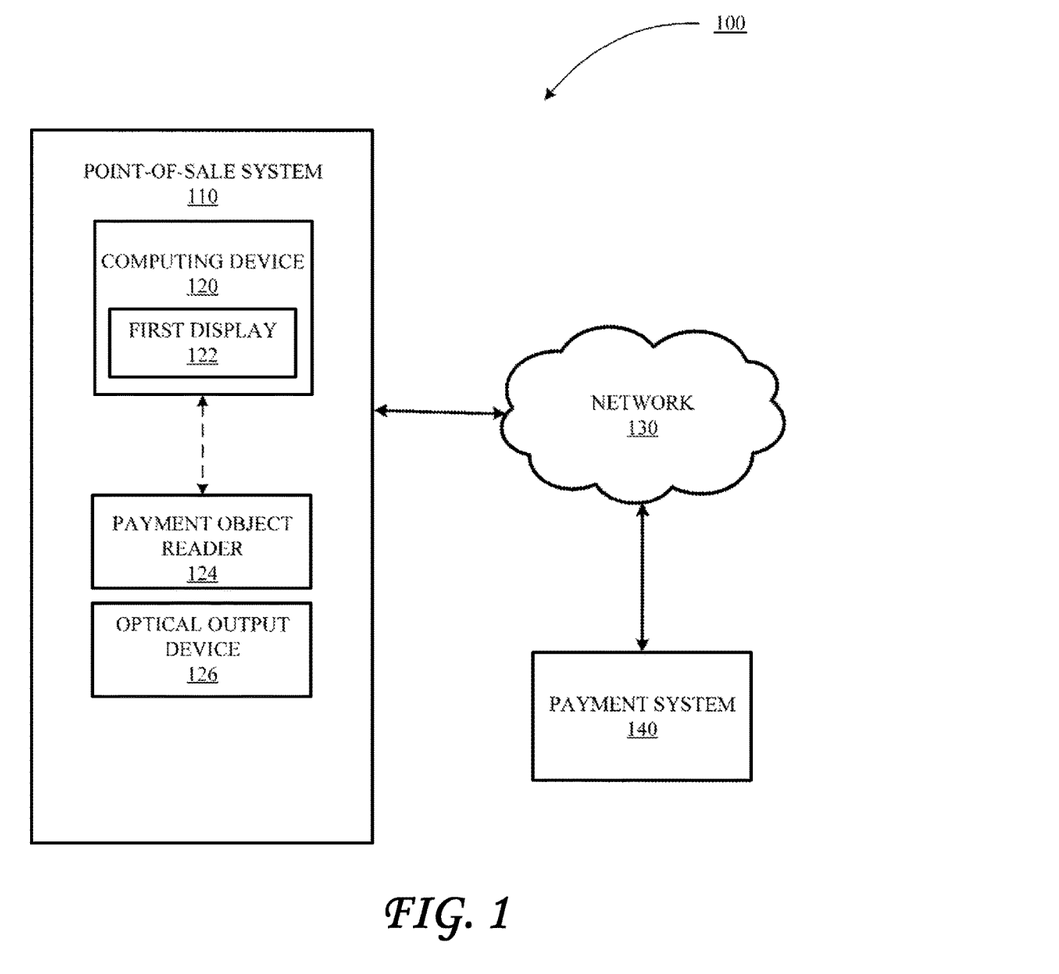
FIG. 1 illustrates an example overview block diagram of a point-of-sale system including a computing device and a payment object reader, in accordance with an embodiment.

Other advantages, variations, and functions are described and suggested below as may be provided in accordance with the various embodiments. FIG. 1 illustrates an example overview block diagram of an environment 100 having a point-of-sale system 110 including a computing device coupled to a payment object reader, in accordance with an embodiment. The point-of-sale system 110 includes a computing device 120 having a first display 122, and the computing device 120 is coupled to a payment object reader 124 that includes an optical output device 126. The computing device 120 can be any appropriate device, generally having a merchant application running thereon, such as a tablet, personal computer, laptop computer, desktop computer, mobile phone, or other device capable of downloading applications and connecting to other devices via a communication module, as described in greater detail herein. The computing device 120 receives payment information from the payment object reader 124 and transmits the information over a network 130 to a payment system 140, such as a financial institution or bank account, as described in greater detail herein. The computing device 120 includes a first display 122 having a brightness setting reflecting the brightness of the first display. In accordance with the embodiments herein, the payment object reader is able to receive the brightness settings of the first display and coordinate the brightness setting of the optical output device 126 to coincide with the brightness settings of the first display. The payment object reader can query the computing device for the display settings, or it is possible for the computing device to transmit the brightness settings to the payment object reader in increments of a predetermined amount of time, for example, but not limited to, every 30 seconds. The optical output device 126 can be integrated onto a surface of the payment object reader 124 or a standalone display separate from, but proximate to, the payment object reader 124.

Figure 2:
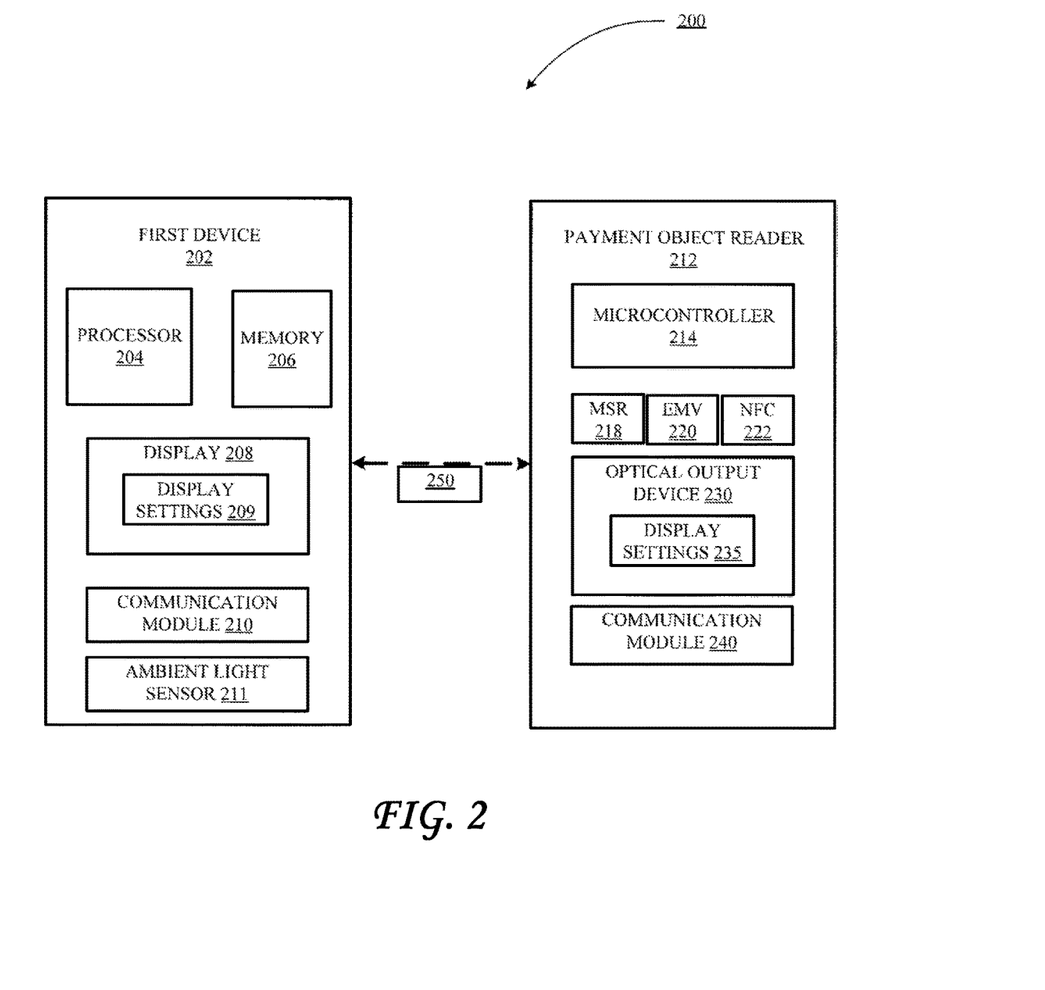
FIG. 2 illustrates an example schematic diagram of the components of the computing device and the payment object reader, in accordance with an embodiment.

FIG. 2 illustrates an example schematic diagram of the components of the computing device and the payment object reader, in accordance with an embodiment. In the point-of-sale system 200, a first device 202 is coupled to a payment object reader 212 to perform a point-of-sale transaction.

The first device includes a processor 204 for carrying out the functions of the first device 202, and a memory 206 that can include both RAM and ROM memory used for storage and in performing the functions of the first device 202. The first device 202 includes a display 208 having display settings 209. Although the display settings 209 are shown as being a part of the display 208, in operation, the display settings can be stored in memory 206. The first device 202 can be any computing device, such as a mobile phone, laptop computer, etc. capable of receiving payment object data from a payment object reader and sending the information to an appropriate entity for confirmation of payment. The display 208 can be an LCD, touchscreen, or other appropriate display. The first device 202 includes a communication module 210 for communicating with the payment object reader 212 and also the payment system to verify the payment in the point-of-sale transaction. The first device 202 and the payment object reader 212 are coupled 230 either directly via a connector on the payment object reader 212 interfacing with a connector on the first device 202, or indirectly via a wireless communication, such as WiFi, Bluetooth, BLE, or others. The first device 202 can also include an ambient light sensor 211 in some embodiments. The ambient light sensor can be used to set the brightness of the first device 202. The ambient light sensor 211 is shown in dashed-line as it is an optional feature not necessary to operation of the first device 202 or of the point-of-sale system 200. In embodiments lacking the ambient light sensor, the brightness of the display 208 of the first device 202 can be set manually.

The device 202 can include an operating system stored in memory 206 that is run by a processor 204. The operating system interacts with the display 208 and can manage the associated display settings 209. The operating system uses the communication module 210 to communicate with the payment object reader 212. The operating system interacts with the ambient light sensor 211 to request and/or receive data as appropriate. The operating system can be any appropriate program installed in memory of the device 202 that manages all other programs and functions in the device 202.

The payment object reader 212 is communicatively coupled at 250 by any appropriate direct-wired or wireless communication, including but not limited to audio signals, WiFi (Wireless Fidelity) communications, Bluetooth (BT), Bluetooth Low Energy (BLE), LiFi and other optical communications. The payment object reader 212 includes a microcontroller 214 for carrying out the functions of the payment object reader 212. The payment object reader 212 also includes a magnetic stripe reader (MSR) module 218 for reading information from a payment object such as a magnetic strip payment card, an EMV module for reading information from an EMV-type payment object, and an NFC module 222 for reading information from an NFC-type payment object. In some embodiments, the EMV module and the NFC module can be replaced with a single module that supports capabilities of reading data from both types of payment objects. The payment object reader 212 includes an optical output device 230 having display settings 235. As described herein, it is advantageous for the display settings 235 of the optical output device 230 of the payment object reader 212 to correspond to the display settings 209 of the display 208 of the first device 202. It is also advantageous for the brightness of the optical output device to change with the changes in the brightness of the first display, without requiring additional user input. The payment object reader 212 includes a communication module 240 for communicating with the first device and also for sending information over the network to the desired other entities for confirmation of payment in a point-of-sale transaction.

The optical output device 230 can be an indicator of signal strength between a payment object and the payment object reader. For example, when the payment object is an NFC-type payment object, it is desirable to have an optical output device that indicates the level of signal strength between the payment object and the payment object reader. The optical output device 230 can comprise a single light-emitting-diode (LED) in some embodiments. In a single LED embodiment, the LED can be configured to display a first color for a poor signal strength, such as red, a second color for a medium signal strength, such as yellow, and a third color for a good signal strength, such as green. The optical output device 230 can comprise a plurality of LEDs, such as a first LED for a first "poor" signal strength for when the payment object is a first predetermined distance from the payment object reader; a second LED for a second "fair" signal strength for when the payment object is a second predetermined distance from the payment object reader; a third LED for a third "good" signal strength for when the payment object is a third predetermined distance from the payment object reader; and a fourth LED for a fourth "excellent" signal strength for when the payment object is a fourth predetermined distance from the payment object reader. In the embodiment having four LEDs, the fourth predetermined distance is greater than the third predetermined distance, the third predetermined distance is greater than the second predetermined distance, and the second predetermined distance is greater than the first predetermined distance. It is also possible to only indicate a "good" or "bad" signal strength using the optical output device of the payment object reader. For example, the "good" signal strength can be indicated by all 4 LEDs lighting up, while the "bad" signal strength is any number of LEDs less than all 4 LEDs.

Figure 3:
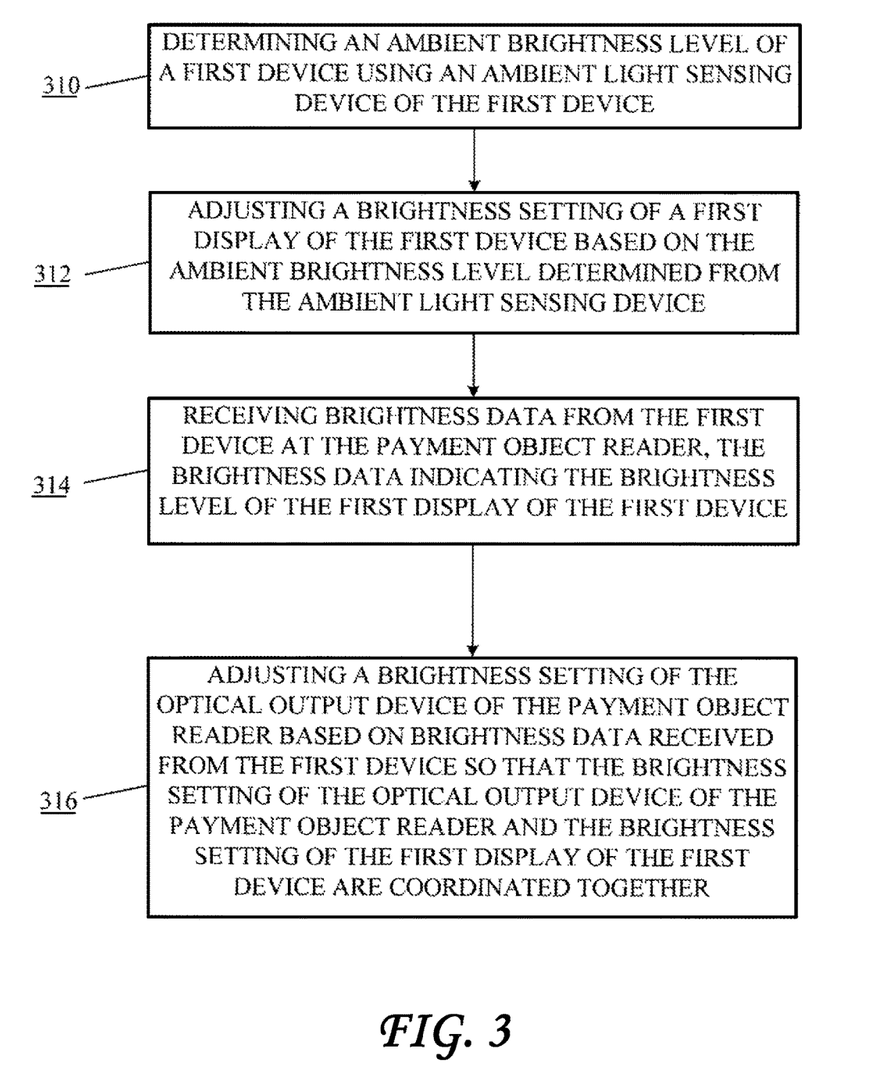
FIG. 3 illustrates an example process for controlling a brightness setting of a peripheral device of a point-of-sale system, where a computing device of the point-of-sale system includes an ambient light sensor, in accordance with an embodiment.

FIG. 3 illustrates an example process for controlling a brightness setting of a peripheral device of a point-of-sale system, where a computing device of the point-of-sale system includes an operating system, an ambient light sensor and has a merchant application running thereon, in accordance with an embodiment. In the example process 300, at 310 an ambient brightness level of a first device is determined using an ambient light sensing device of the first device, such as ambient light sensor 211 in FIG. 2. At 312, a brightness setting of the first display of the first device is adjusted based on the ambient brightness level determined from the ambient light sensing device. At 314, the brightness data from the first device is received at the payment object reader. The brightness data indicates the brightness level of the first display of the first device. The brightness data that is received by the payment object reader can be sent by at least one the following non-limiting examples: (1) sent by the operating system of the device as raw data directly from the ambient light sensor, (2) sent by the operating system of the device as a screen brightness value determined by logic of the device from the raw ambient light sensor data, (3) sent by the merchant application running on the device as raw data directly from the ambient light sensor, or (4) sent by the merchant application running on the device as a screen brightness value determined by logic of the device from the raw ambient light sensor data. The brightness data received at the payment object reader can occur by the first device automatically sending the brightness data to the payment object reader in increments of a predetermined amount of time (for example, every 60 seconds) or the payment object reader can query the first device for the brightness data at a specific time, such as when the payment object reader is turned on and/or plugged into the first device.

At 316, the brightness setting of the optical output device of the payment object reader is adjusted based on the brightness data received from the first device. Adjusting the brightness setting of the optical output device can be an exact match of a brightness data value, or a relative change with respect to each other, such that when the brightness level of the first device increases, the brightness level of the optical output device also increases; and likewise when the brightness level of the first device decreases, the brightness level of the optical output device also decreases. In this manner, the brightness setting of the optical output device of the payment object reader is coordinated together with the brightness setting of the first display of the first device, without requiring any user input and without requiring the brightness of the optical output device and the first device to each be controller individually.

The acquiring, sending, receiving and setting of brightness data can occur in accordance with various techniques. In some embodiments, the microcontroller of the payment object reader includes logic that can convert received brightness data into a coordinated value for the optical output device. For example, the payment object reader can receive a brightness value of the first device to which it is coupled, determine a number of lumens associated with the brightness value of the first device, and determine a number of lumens for the optical output device that is the same as, or as close to as possible, the number of lumens of the brightness value of the first device, and then set the brightness of the optical output device to have that number of lumens. In other embodiments, the device can have logic to determine a number of lumens corresponding to the brightness of the display, then determine a number of lumens of the optical output reader that is coordinated to the number of lumens of the display, and send a brightness setting to the payment object reader that corresponds to the desired number of lumens of the optical output reader. In other embodiments, for example where the device lacks an ambient light sensor, the device can include logic to set the display settings of the display of the first device to the lowest possible setting. Likewise, the display settings of the optical output device of the payment object reader can be set to the lowest setting. Thereafter, each increase in the brightness of the display of the first device can cause the first device to send a signal to the payment object reader indicative of a corresponding increase in the brightness of the optical output device.

It should be clear that in embodiments where the first device does not have an ambient light sensor, the brightness setting of the first device is not adjusted based on the ambient brightness level determined from the ambient light sensing device. Rather, the brightness setting is manually set and received at the payment object reader, without determining the ambient brightness level and without adjusting the brightness setting of the first display based on the ambient brightness data.

It should also be clear that the operation of the optical output device in terms of providing an indicator of signal strength does not change in functionality. A typical NFC field strength indicator can be implemented. The teachings herein affect only the brightness of the LEDs used in the indicator of signal strength, and not the operation of the LEDs, unless otherwise noted.

Figure 4:
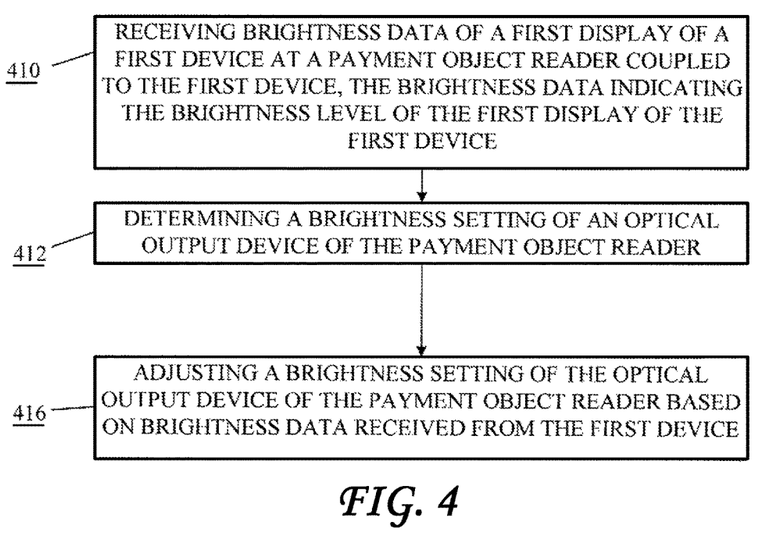
FIG. 4 illustrates an example process for controlling a brightness setting of a peripheral device of the point-of-sale system, where a computing device of the point-of-sale system does not include an ambient light sensor, in accordance with an embodiment.

FIG. 4 illustrates an example process for controlling a brightness setting of a peripheral device of the point-of-sale system, where a computing device of the point-of-sale system does not include an ambient light sensor, in accordance with an embodiment. At 410, the brightness setting of the first display of the first device is received at the payment object reader that is coupled to the first device. This can be an initial value that is pre-set by the factory, manually set by a user or determined automatically by software of the first device based on, for example, a time of day calculation, in which the brightness setting of the first display is automatically changed over the course of a day based on the system clock or other system components. The brightness setting of the first display of the first device can be received at the payment object reader from the operating system of the card reader (or from the merchant application) as raw data obtained from the ambient light sensor of the device, for example the ambient light sensor 211 or FIG. 2. Alternatively, the device can convert the brightness data from the ambient light sensor into a coordinated value that the operating system, or the merchant application, can send to the payment object reader. At 412, the brightness setting of an optical output device of the payment object reader is determined. At 414, the brightness setting of the optical output device of the payment object reader is adjusted to correspond to the brightness data received from the first device. Accordingly, the brightness of both the optical output device and the first device coincide with each other.

Figure 5:
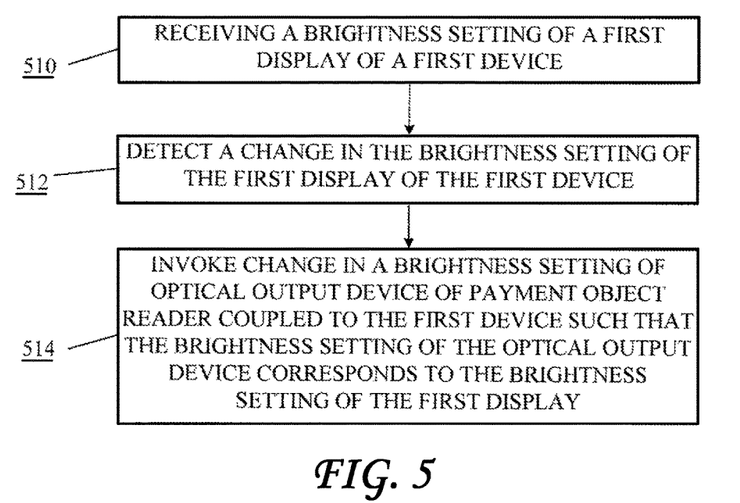
FIG. 5 illustrates an example process for adjusting a brightness setting of a peripheral device coupled to a payment object reader correspond to a brightness setting of a computing device coupled to the payment object reader in a point-of-sale system, in accordance with various embodiments.

FIG. 5 illustrates an example process for adjusting a brightness setting of a peripheral device coupled to a payment object reader to correspond to a change in a brightness setting of a computing device in a point-of-sale system, in accordance with various embodiments. At 510, a brightness setting of a first display of a first device is received. At 512, a change in the brightness setting of the first display of the first device is detected. This can occur by the first display sending a signal to the payment object reader whenever the brightness is changed, thereby indicating a change in brightness setting, or as a query from the payment object reader requesting if there has been a change, and/or verifying that a change has been made. At 514, a change in the brightness setting of the optical output device of the payment object reader is invoked such that the brightness setting of the optical output device corresponds to the brightness setting of the first display. Thus, any change in the first device brightness is also reflected in the brightness of the optical output device of the payment object reader.

Figure 6:
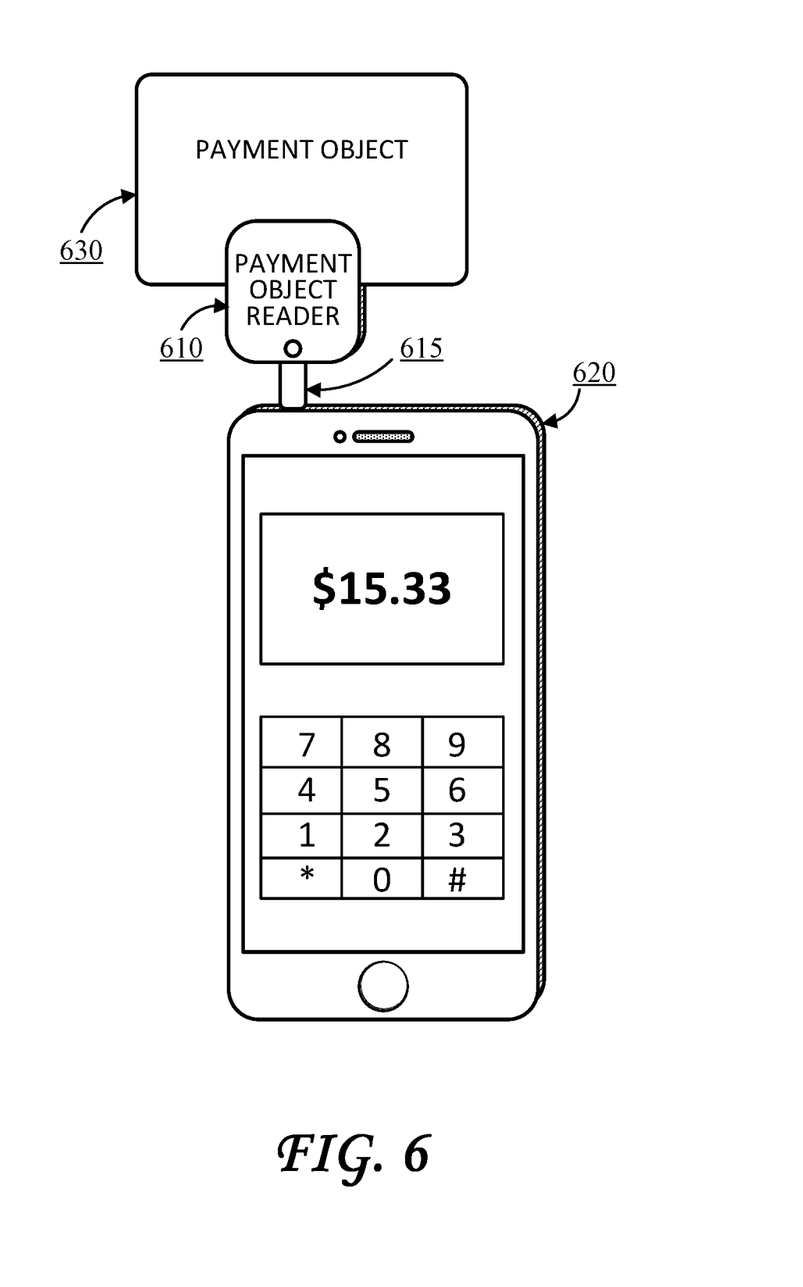
FIG. 6 illustrates an example view of a computing device with a payment object reader directly coupled to the computing device, in accordance with an embodiment.

FIG. 6 illustrates an example view of a computing device with a payment object reader directly coupled to the computing device, in accordance with an embodiment. As shown, a payment object reader 610 is coupled to a mobile device 620. The payment object reader 610 is coupled to the mobile device 620 via direct connection in this example embodiment. The payment object reader 610 includes an output connector 615 configured to be received by an input connector of the mobile device 620. For example, the output connector 615 can be an audio plug configured to mate with an audio jack of the mobile device 620. The payment object reader includes an optical output device 612, which is a single indicator element in this embodiment. The optical output device can comprise a plurality of LEDs or a single visual indicator. The optical output device 612 is used to indicate signal strength between a payment object 630 and the payment object reader 610. Although the payment object 630 is shown as a magnetic stripe-type card being swept in a slot of the payment object reader 610, it is contemplated that other payment objects can be used, and an NFC-capable payment object need not be placed in the slot of the payment object reader, but rather proximate the payment object reader 610 until the optical output device 612 indicates a positive signal strength sufficient to read the payment information from the payment object.

Figure 7:
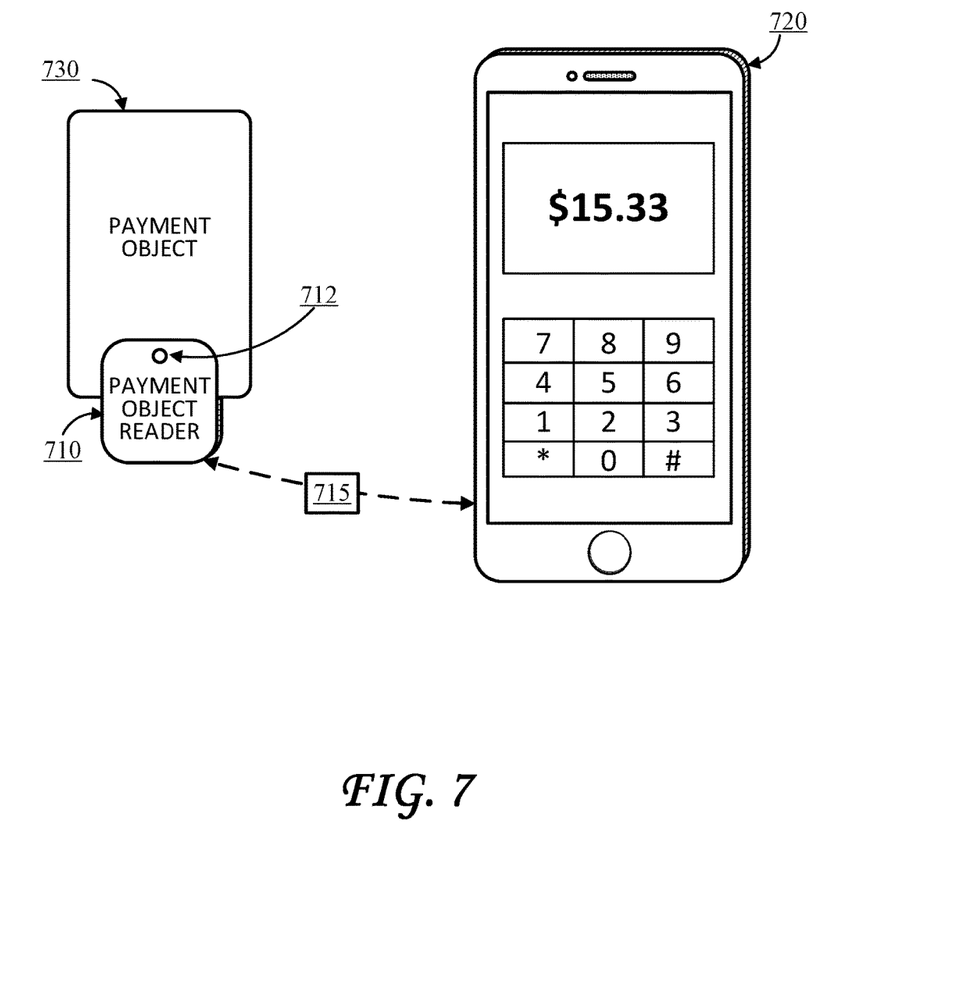
FIG. 7 illustrates an example view of a computing device with a payment object reader operatively coupled to the computing device, in accordance with an embodiment.

FIG. 7 illustrates an example view of a computing device with a payment object reader operatively coupled to the computing device, in accordance with an embodiment. As shown, a payment object reader 710 is wirelessly coupled 715 to a mobile device 720. The payment object reader 710 can be coupled to the mobile device 720 via any appropriate wireless communication, such as Bluetooth, BLE, WiFi, LiFi, etc. The payment object reader includes an optical output device 712, which is a single LED or single indicator in this embodiment. Any number of LEDs, or types of indicator displays, can be implemented. The optical output device 712 is used to indicate signal strength between a payment object 730 and the payment object reader 710. In accordance with the teachings herein, the brightness of the optical output device 712 is controlled to be coordinated with the brightness of the device 720.

Figure 8:
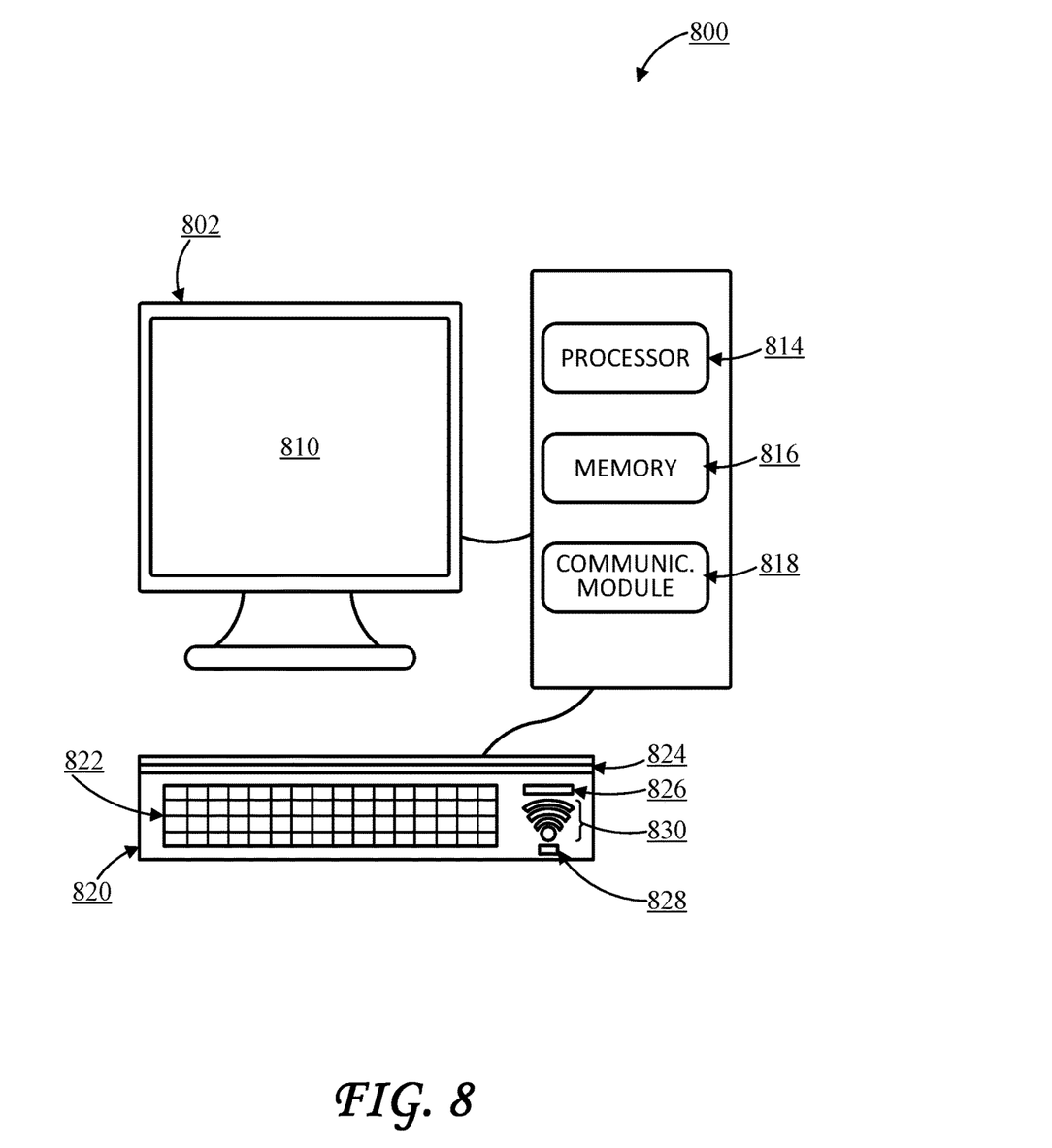
FIG. 8 illustrates an example view of a point-of-sale system having a hybrid interface, in accordance with an embodiment.

FIG. 8 illustrates an example view of a point-of-sale system having a hybrid interface, in accordance with some embodiments. The point-of-sale system 800 includes a monitor 802 having a display 810. The monitor 802 is connected to a computing device 812 having a processor 814, memory 814 and a communication module 818. The communication module 818 enables the computing device 812 to communicate with other entities over a network, such as to provide payment object information when relevant, and also to enable communication with the payment object reader when not directly coupled to the computing device 812. The point-of-sale system 100 includes a hybrid interface 820 that includes the necessary interfaces for the payment objects and also the optical output device, as well as a keyboard or other input interface 822 for communicating with the computing device 812 and/or the payment object reading interfaces 822, 826, 828 and 830. The input interface 822 can be a touchscreen display or a conventional keyboard with keys for typing letters.

The hybrid interface 820 includes a "swipe" slot for receiving magnetic stripe-type cards, a "dip" slot 826 for EMV or chip-type cards and an NFC module 828 for interfacing with NFC payment objects. The optical output device 830 is also included on the hybrid interface 820 to display a signal strength between an NFC-enabled payment object and the NFC module 828. In this manner, a single point-of sale system is capable of accepting all types of cards and also the brightness of the optical output display 830 is coordinated to the brightness of the display 810.

The various example embodiments and processes herein describe and show how one can control the brightness of an optical output device of a payment object reader to coordinate with the brightness of a device coupled to the payment object reader.

Having now described various example embodiments of the point-of-sale system used in a point-of-sale transaction, some example environments for conducting a financial transaction at a point-of-sale system will now be described. Other environments and applications of the point-of-sale system should be apparent to those ordinarily skilled in the art.

Figure 9:
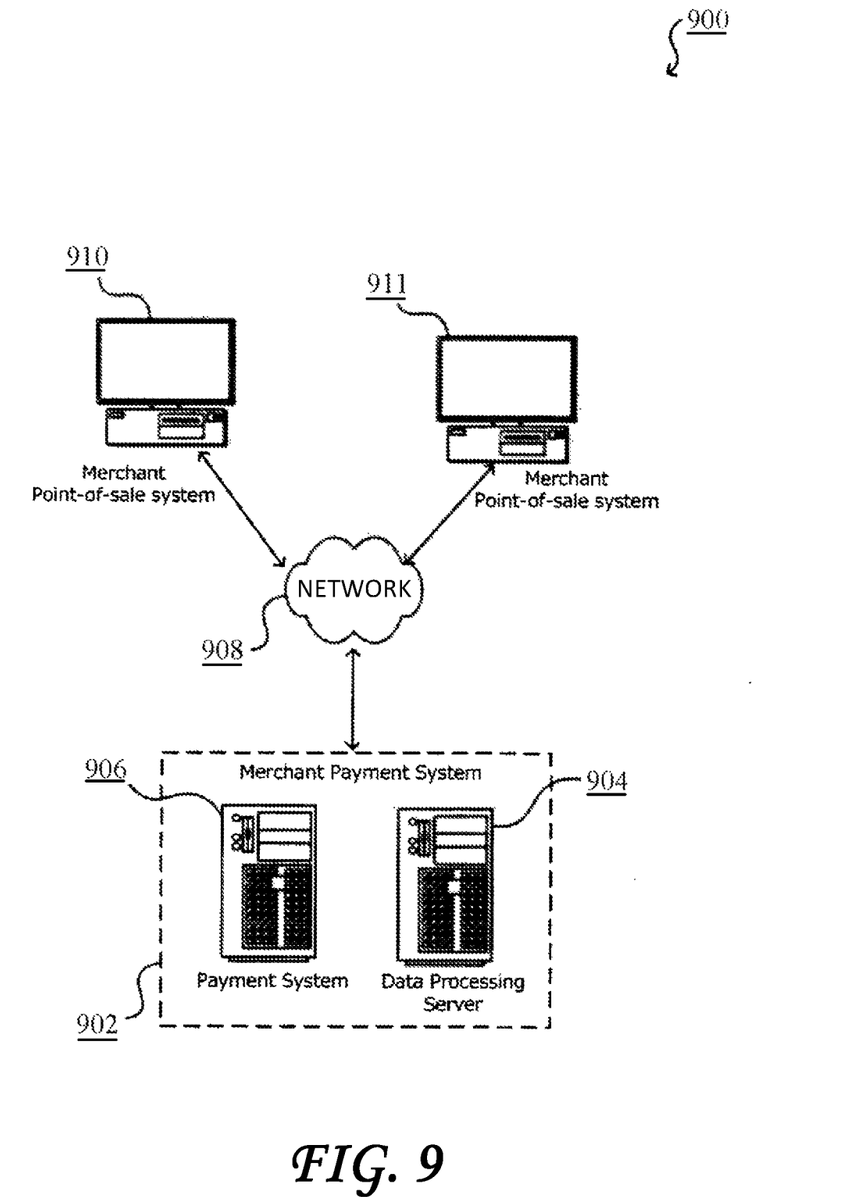
FIG. 9 illustrates an example environment for conducting a financial payment transaction using a payment object reader in accordance with an embodiment.

FIG. 9 illustrates an example environment for conducting a financial transaction at a point-of-sale system in accordance with various embodiments. In this example, the example environment 900 includes a merchant payment system 902 for processing transactions between a customer and a merchant. The merchant payment system includes, for example, a data processing server 904 and a payment server 906. The data processing server can be implemented as computer programs on one or more computers in one or more locations, in which the systems, components, and techniques described below, can be implemented. The operation of the payment server is described below in reference to FIG. 10. The example environment also includes computing devices, e.g., transaction registers or other point-of-sale systems, corresponding to the merchant point-of-sale systems 910 and 911.

As described, the point-of-sale systems 910 and 911 can include the payment object reader and computing device, where the computing device can be coupled to or in communication with the merchant payment system through a data communication network 908, e.g., the Internet. These devices each generally include a memory, e.g., a random access memory (RAM), for storing instructions and data, and a processor for executing stored instructions. The devices and can each include one or more components, e.g., software or hardware, that are operable to send and receive requests, messages, or other types of information over the network. Some examples of computing devices include personal computers, cellular phones, handheld messaging devices, laptop computers, personal data assistants, tablet devices, and the like.

The network 908 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The devices and the referral system can communicate over the network using wired or wireless connections, and combinations thereof.

Each of the computing devices is configured to send to the merchant payment system respective financial data that corresponds to a financial transaction that was processed by the computing device. The financial data can include, for example, data stored in a financial payment card, e.g., Track 1 data, receipt email addresses, and information describing a card-less payment account. Other examples of financial data that can be captured includes purchase data, e.g., an itemized listing of purchases, card mix data, geolocation data indicating a geographic location of a particular transaction, online/offline card data, data describing the merchant, e.g., merchant category codes (MCCs), and any type of data that is received upon a customer's authentication into a social network.

Figure 10:
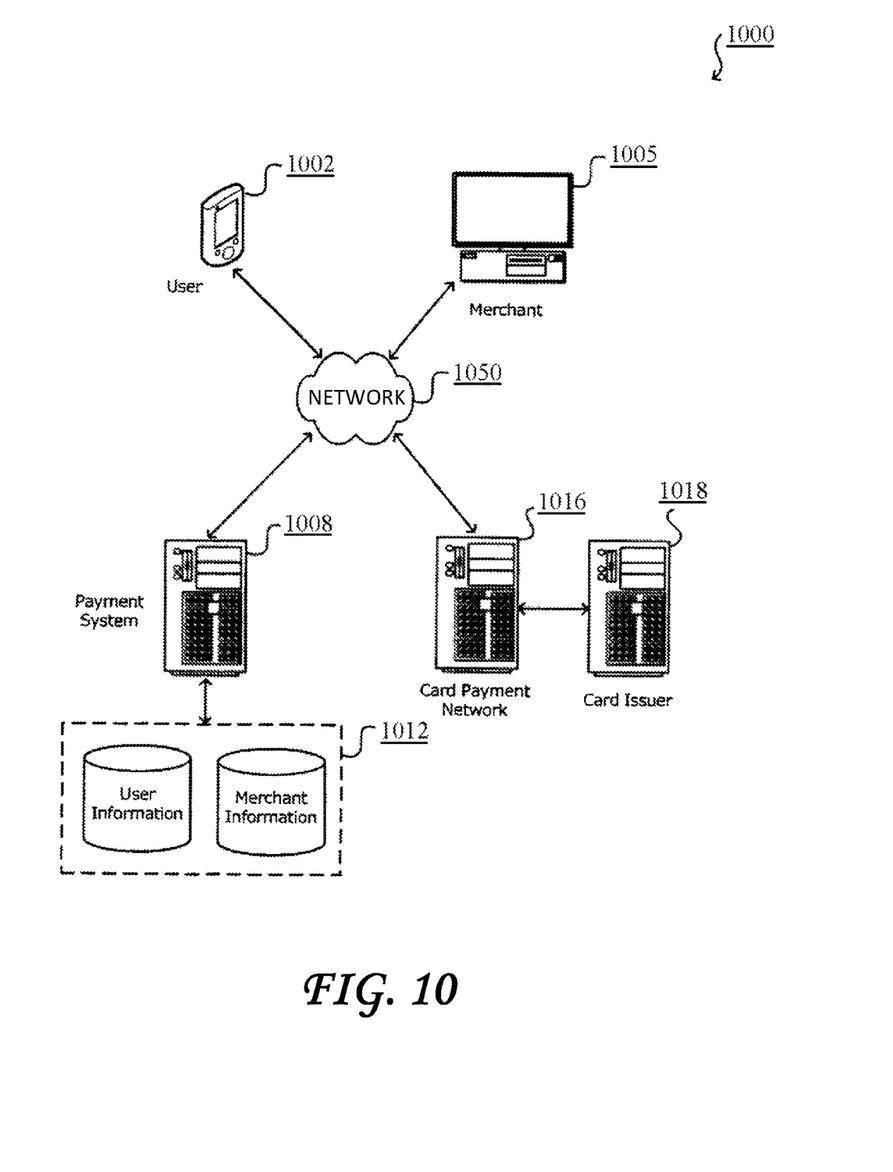
FIG. 10 illustrates an example environment for implementing a merchant payment system using a payment object reader in accordance with an embodiment.

FIG. 10 illustrates an example of an environment 1000 for implementing a payment service network. Although a mobile device environment is described for purposes of explanation, different environments may be used, e.g., a web-based environment, to implement various embodiments. The example environment includes a payment system 1008, which can be implemented as computer programs on one or more computers in one or more locations, in which the systems, components, and techniques described below can be implemented. The example environment also includes a user device 1002 and a merchant device 1005.

The user device and the merchant device can each be a computer coupled to the payment system through a data communication network 1050, e.g., the Internet. The user device and the merchant device each generally include a memory, e.g., a random access memory (RAM), for storing instructions and data, and a processor for executing stored instructions. The user device and the merchant device can each include one or more components, e.g., software or hardware, that are configured to respectively determine a geographic location of the user device or the merchant device, using, for example, various geolocation techniques, e.g., a global positioning system (GPS). Further, the user device and the merchant device can each be any appropriate device operable to send and receive requests, messages, or other types of information over the network. Some examples of user devices include personal computers, cellular phones, handheld messaging devices, laptop computers, personal data assistants, tablet devices, and the like.

The network can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system, the merchant device, and the user device can communicate over the network using wired or wireless connections, and combinations thereof.

As used in this specification, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

The payment system can also be configured to communicate with a computer system 1016 of a card payment network, e.g., Visa or MasterCard, over the network, or over a different network, for example, to conduct electronic financial transactions. The computer system of the card payment network can communicate with a computer system 1018 of a card issuer, e.g., a bank. There may be computer systems of other entities, e.g., the card acquirer, between the payment system and the computer system of the card issuer.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method of controlling brightness of an optical output device of a payment object reader, a design of the payment object reader being such that the payment object reader does not include any ambient light sensor, the payment object reader being coupled to a computing device having an ambient light sensor, the method comprising:

receiving, by a merchant application running on the computing device, an ambient brightness level measured by the ambient light sensor via an operating system of the computing device, wherein the computing device is configured to adjust a first brightness level of a display of the computing device based on the ambient brightness level, and wherein the merchant application of the computing device is configured to perform a point-of-sale transaction based on payment information received by the payment object reader;

receiving ambient brightness data at the payment object reader from the merchant application running on the computing device, the ambient brightness data corresponding to the ambient brightness level measured by the ambient light sensor of the computing device; and adjusting a second brightness level of the optical output device of the payment object reader based on the ambient brightness data received by a microcontroller of the payment object reader so that the second brightness level of the optical output device and the first brightness level of the display of the computing device are coordinated and are based on the ambient brightness level.

2. The computer-implemented method of claim 1, wherein receiving the ambient brightness data at the payment object reader from the computing device reoccurs periodically based on increments of a predetermined amount of time.

3. The computer-implemented method of claim 1, wherein receiving the ambient brightness data at the payment object reader from the computing device comprises querying the computing device for the ambient brightness data by the payment object reader.

4. The computer-implemented method of claim 1, wherein adjusting the second brightness level comprises matching the second brightness level of the optical output device to the first brightness level of the display.

5. The computer-implemented method of claim 1, further comprising:

detecting an increase in the first brightness level of the display of the computing device; and increasing the second brightness level of the optical output device of the payment object reader in response to the increase in the first brightness level.

6. The computer-implemented method of claim 1, further comprising:

detecting a decrease in the first brightness level of the display of the computing device; and decreasing the second brightness level of the optical output device of the payment object reader in response to the decrease in the first brightness level.

7. The computer-implemented method of claim 1, wherein the adjusting of the second brightness level of the optical output device is performed via the microcontroller of the payment object reader.

8. A point-of-sale system, comprising:
a computing device including:
a processor that is configured to execute a merchant application on the computing device,
a display that is configured to display content at a first brightness level, and
a first communication interface that is configured to receive payment information from a second communication interface of a payment object reader and that is also configured to transmit a brightness setting identifying the first brightness level to the second communication interface of the payment object reader; and
the payment object reader including:
an optical output device that is configured to output light at a second brightness level,
a payment object reader interface element that is configured to read the payment information from the payment object,
the second communication interface that is configured to transmit the payment information to the first communication interface of the computing device and that is also configured to receive the brightness setting identifying the first brightness level from the first communication interface of the computing device, and
a microcontroller that receives the first brightness setting identifying the first brightness level from the merchant application running on the processor of the computing device via the second communication interface and adjusts the second brightness level of the optical output device to correspond to the first brightness level of the display of the computing device.

9. The point-of-sale system of claim 8, wherein the optical output device is configured to indicate a level of signal strength between the payment object and the payment object reader, and wherein the optical output device includes at least a first light-emitting-diode (LED) and a second LED, the first LED indicating a first level of the signal strength between the payment object reader and the payment object, and the second LED indicating a second level of the signal strength between the payment object reader and the payment object.

10. The point-of-sale system of claim 8, wherein the optical output device is configured to indicate a level of signal strength between the payment object and the payment object reader, and wherein the optical output device includes at least one LED configured to present a first color indicating a first level of signal strength between the payment object reader and a payment object, the at least one LED further configured to present a second color indicating a second level of signal strength between the payment object reader and the payment object.

11. The point-of-sale system of claim 8, wherein the payment object reader lacks any ambient light sensor, and wherein the computing device also lacks any ambient light sensor.

12. The point-of-sale system of claim 8, wherein the payment object reader lacks any ambient light sensor, and wherein the computing device includes an ambient light sensor, wherein the first brightness level is based on an ambient light level measured by the ambient light sensor of the computing device.

13. The point-of-sale system of claim 8, wherein the computing device is at least one of: a mobile device, a smart phone, a desktop computer, a laptop computer, a tablet, and a portable computing device.

14. The point-of-sale system of claim 8, wherein the first communication interface of the computing device and the second communication interface of the payment object reader collectively include at least one of a Bluetooth (BT) interface, a Bluetooth Low Energy (BLE) interface, a WiFi interface, an audio plug, or an audio jack.

15. The point-of-sale system of claim 8, wherein the payment object reader interface element includes at least one of a magnetic stripe interface configured to read data from a magnetic stripe card, a chip-reading interface configured to read data from a chip of a chip-type card, or an NFC (near field communication) interface configured to receive data from the payment object via NFC.

16. A method of controlling brightness of an optical output device of a payment object reader, a design of the payment object reader being such that the payment object reader does not include any ambient light sensor, the payment object reader being communicatively coupled to a computing device via a communicative coupling, the method comprising:
receiving payment information from a payment object at the payment object reader;
transmitting the payment information to the computing device via the communicative coupling between the computing device and the payment object reader;
receiving brightness information via the communicative coupling at a microcontroller of the payment object reader from a merchant application executed by a processor of the computing device, the brightness information identifying a first brightness level of a display of the computing device; and
adjusting a second brightness level of the optical output device of the payment object reader to match the first brightness level of the display of the computing device.

17. The method of claim 16, further comprising:
receiving an indication at the payment object reader via the communicative coupling, the indication identifying a brightness change in the first brightness level of the display of the computing device; and
increasing or decreasing the second brightness level of the optical output device based on the brightness change includes adjusting the second brightness level to match the first brightness level.

18. The method of claim 16, wherein receiving the first brightness level of the display of the computing device at the microcontroller of the payment object reader from the computing device via the communicative coupling reoccurs periodically based on increments of a predetermined amount of time.

19. The method of claim 16, wherein receiving the brightness change information at the payment object reader from the computing device comprises:
requesting from the computing device, by the payment object reader, the first brightness level of the display of the computing device.

20. The method of claim 16, wherein the communicative coupling includes a wireless interface, and wherein receiving the first brightness level of the display of the computing device at the microcontroller of the payment object reader from the computing device via the communicative coupling includes receiving one or more wireless signals at the payment object reader, the one or more wireless signals conveying the first brightness level.

21. The method of claim 16, wherein the communicative coupling includes a direct electrical connection between the payment object reader and the computing device, and wherein receiving the first brightness level of the display of the computing device at the microcontroller of the payment object reader from the computing device via the communicative coupling includes receiving one or more electrical signals at the payment object reader via the direct electrical connection, the one or more electrical signals conveying the first brightness level.

\* \* \* \* \*